United States Patent [19]

Ebner

[11] Patent Number: 4,484,502

[45] Date of Patent: Nov. 27, 1984

[54] WIRE SAW

[75] Inventor: Walter Ebner, Le Locle, Switzerland

[73] Assignee: Caspar O. H. Messner, Zurich, Switzerland

[21] Appl. No.: 474,514

[22] Filed: Mar. 11, 1983

[30] Foreign Application Priority Data

Mar. 13, 1982 [DE] Fed. Rep. of Germany ....... 3209164

[51] Int. Cl.³ .......................... B23D 57/02; B28D 1/08
[52] U.S. Cl. ................................... 83/651.1; 83/307.1; 125/12; 125/21
[58] Field of Search ............................. 83/651.1, 307.1; 125/12, 21, 16 R

[56] References Cited

FOREIGN PATENT DOCUMENTS 2828089 1/1980 Fed. Rep. of Germany ........ 125/21
321389 3/1972 U.S.S.R. ............................ 83/651.1

Primary Examiner—Donald R. Schran
Attorney, Agent, or Firm—Craig & Burns

[57] ABSTRACT

A wire saw which is simple in construction and which, in practice, can effortlessly handle workpieces of any dimensions, yet requires relatively little space, in particular with diamond chip studding on the reciprocating part of the saw wire; the wire saw includes two reels provided with thread-like grooves and arranged on respective shafts for receiving the finite saw wire whereby each reel is operatively connected with a rotary drive in such a manner as to assure synchronization in the direction of rotation and rotational speed; the sawing place is thereby located between the reels.

20 Claims, 8 Drawing Figures

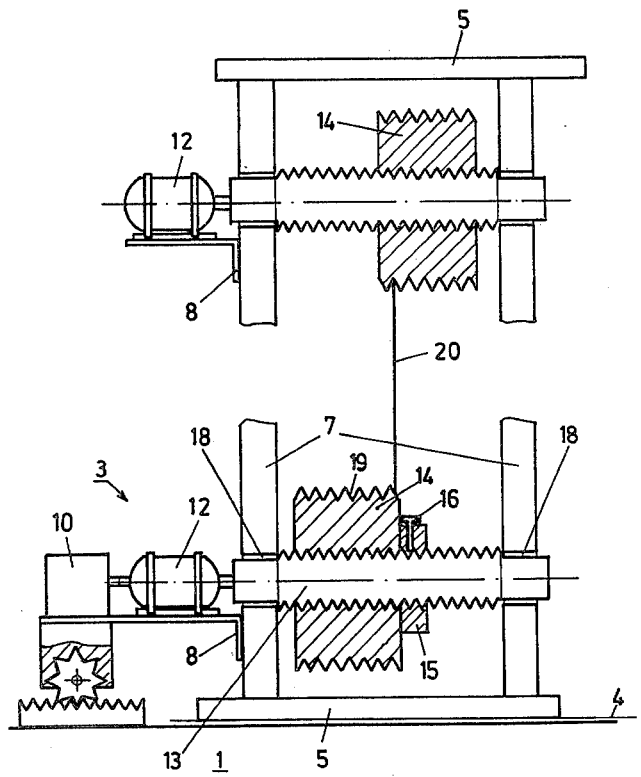
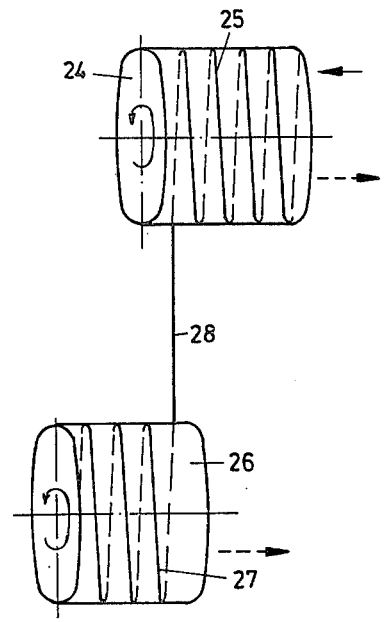
FIG. 1  FIG. 2
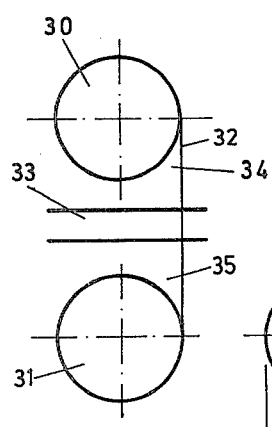
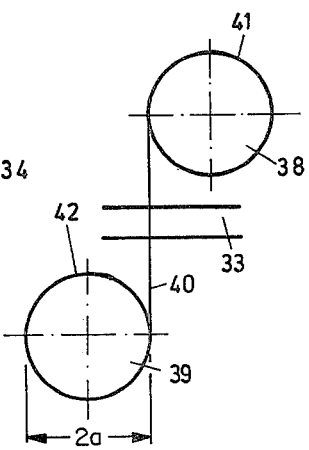
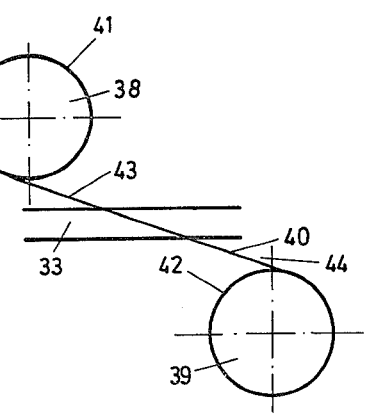
FIG. 3  FIG. 4  FIG. 5

WIRE SAW

The present invention relates to a wire saw with a cutting material coating, especially of the saw wire moved to and fro, with a reel or drum arranged on a shaft or axle, provided with thread-like grooves, displaceable in the direction of its longitudinal axis and connected with a rotary drive for receiving the finite saw wire as well as with an axially parallel wire holder disposed opposite the reel or drum, whereby the sawing place is located between reel and wire holder.

The customary drive system for wire saws, especially for diamond wire saws, includes essentially a driving motor, which drives a reel or drum receiving the wire, and an oppositely disposed roller arranged parallel thereto, on which the wire is held and guided under tension. With this prior art drive system, in which the free wire ends are secured on the reel or drum provided with thread-like grooves, and in which during rotation thereof the wire is wound, respectively, unwound, whereas the roller provided with a groove is arranged at the deflection location, the sawing is carried out, as with a conventional band saw, with the one section of the saw wire which moves in one direction whereas the other section becomes noticeable in an interfering manner, especially when larger workpieces are to be machined which extend over the distance of the two sections.

This disadvantage which results in practice with the prior art wire saws, was avoided heretofore in that the distance of the working section from the returning section was considerably enlarged by the arrangement of additional deflection rollers.

This prior art solution, however, is quite expensive from a material point of view and leads to costly space-consuming wire saws.

The present invention aims at providing a more simple wire saw which does not exhibit the aforementioned disadvantages also for larger workpieces, yet is nevertheless more simple and more inexpensive both from an operating as also from a manufacturing point of view and is suited in particular also for cutting out shapes.

A wire saw in accordance with the present invention is characterized in that the wire holder includes at least one further reel or drum provided with thread-like grooves and displaceable in the direction of its longitudinal axis which is synchronized with the rotary drive as regards direction of rotation and rotary speed, whereby means are provided to correspondingly displace the grooved reels or drums in a direction opposite to the axial wire displacement and to maintain the cutting plane of the wire with respect to the workpiece.

These and further objects, features and advantages of the present invention will become more apparent from the following description when taken in connection with the accompanying drawing which shows, for purposes of illustration only, several embodiments in accordance with the present invention, and wherein:

FIG. 1 is a schematic cross-sectional view through a part of a saw installation in accordance with the present invention;

FIG. 2 is a schematic perspective view of the reels or drums carrying the saw wire of the saw installation according to FIG. 1;

FIG. 3 is a schematic view of a possible arrangement of the reels or drums in accordance with the present invention which both carry right-hand or left-hand threads;

FIG. 4 is a schematic view of a modified arrangement of the reels or drums, in which one reel has a right-hand thread and the other a left-hand thread;

FIG. 5 is a schematic view of a still further arrangement of the reels or drums with optimum utilization of the saw wire;

Figure 6:
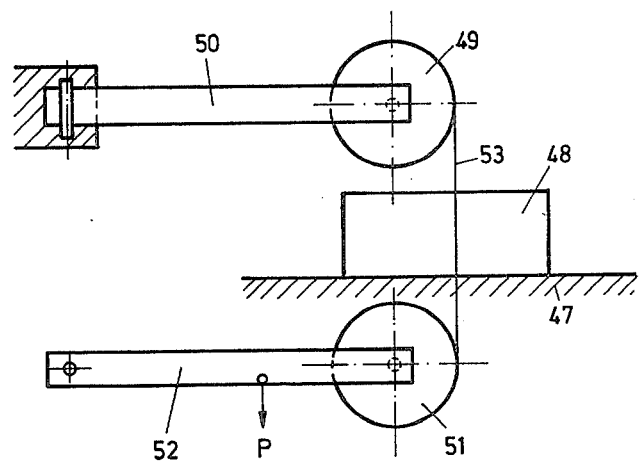
FIG. 6 is a schematic view of a saw arrangement in accordance with the present invention with reels or drums held fast on pivotal arms.

Referring now to the drawing wherein like reference numerals are used throughout the various views to designate like parts, the wire saw generally designated by reference numeral 3 which is illustrated in FIG. 1 includes a work bench 1 with a slide track 4 and a carriage 5 on which is arranged a frame 7. A bracket 8 is located on one side of the frame 7. A lineaar actuating mechanism 10, for example, in the form of a toothed rack transmission, is connected with the carriage 5, whereby the drive of the pinion can take place from the motor 12 by way of an angular drive. A saw driving motor 12 is secured on the bracket 8 which drives a shaft 13 on which is disposed a wire guidance reel or drum 14. This reel or drum 14 is nonrotatably connected with the shaft 13 by means of a collar 15 and a worm screw 16. The shaft 13 is held in two shaft bearings 18. The wire guide reel or drum 14 is provided with external threads 19.

An oppositely disposed part of similar construction is provided above this part of the machine suspended displaceable in the same machine frame. The two driving motors 12 are synchronized by conventional means so that the saw wire saws the workpiece without additional stresses as a result of unequal rotational speeds with the same reel or drum diameters and the same threads. The two free ends of the saw wire 20 are secured on the two reels or drums 14 in such a manner that with a synchronous rotation of the two reels or drums, the wire 20 is unwound from one reel and wound on the other reel and vice versa. During this winding and unwinding, the two reels are displaced toward one another in one direction of rotation and away from one another in the other direction of rotation by the also synchronized toothed rack transmissions 10 in such a manner that the saw wire 20 moves once from the top toward the bottom and then from the bottom toward the top. The arrows, shown in full line and in dash and dotted line, indicate the respectively associated movement directions of the reels or drums, which are such that the saw wire 20 remains in one and the same saw plane with respect to the workpiece, which saw plane extends perpendicular to the plane of the paper of FIG. 1. This switching can take place by electric limit switches. For example, two servo D.C. motors with four quadrant-output steps can be used for the drive of the two reels or drums 14. However, it is also possible to secure one reel or drum on a smooth shaft and to move this structure correspondingly to and fro and fro and to in order to keep the cutting plane always at the same location.

For the purpose of a better understanding, FIG. 2 illustrates in perspective view an upper reel or drum 24 with right-hand thread 25 and a lower reel or drum 26 also with right-hand thread 27, between which the saw wire 28 secured at its ends at the reels or drums, is wound, respectively, unwound.

FIGS. 3, 4 and 5 illustrate different arrangements. Thus, in FIG. 3, an upper reel or drum 30 and a lower reel or drum 31 are illustrated with the saw wire 32 and the workpiece 33 disposed therebetween. Two dead spaces 34 and 35 will result in this case, whereby the saw wire 32 cannot be used beyond the area delimited by the height of these dead spaces. This arrangement operates with two reels or drums having the same direction of rotation of the threads, i.e., with two right-hand threads, respectively, with two left-hand threads. This arrangement is likely to exert the least alternate stressing on the wire and thus increases the length of life thereof.

In FIG. 4 the winding, respectively, unwinding of the wire takes place by an upper reel or drum 38 and a lower reel or drum 39 with the saw wire 40 disposed therebetween. The upper reel 38 is provided, for example, with a right-hand thread, and the lower reel 39 with a left-hand thread 42 or vice-versa.

If the reels or drums according to FIG. 4 are moved away from one another, then one obtains the arrangement according to FIG. 5, in which the dead space 43, respectively, 44 is minimized. The length of the saw wire section which is useable for sawing, is considerably greater in that case than in the embodiments according to FIGS. 3 and 4. The guidance of the saw wire is possible in this case up to in front of the workpiece edges.

A somewhat modified arrangement is illustrated in FIG. 6, in which a work bench 47 for accommodating a workpiece 48 is provided. An upper reel or drum 49 is rotatably held in an arm 50 which is arranged pivotal in a horizontal direction whereas the lower reel or drum 51 is secured at a vertically pivotal pivot arm 52.

The saw wire 53 travels over the two reels or drums 49 and 51. By the attachment of a weight P, the saw wire tension necessary for sawing is produced. This weight P can be arranged displaceable on the pivot arm 52, which makes it possible to match the preselection of the tension to the workpiece to be sawed.

Figure 7:
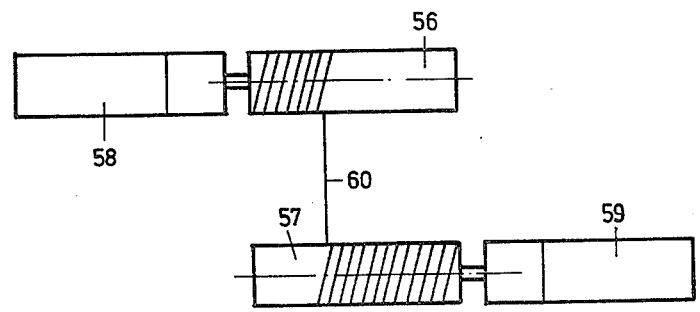
FIG. 7 is a schematic view of a saw arrangement in accordance with the present invention with self-locking reduction gear motors.

An upper reel or drum 56 and a lower reel or drum 57 can be seen in FIG. 7 which are each driven by way of a reduction gear motor 58 and 59. A saw wire 60 is disposed therebetween. This arrangement offers the advantage that no special blocking or braking means must be provided in order to prevent and unintentional unwinding of the wires, especially during the reversal phases of the direction of rotation, for a reduction gear motor is self-locking.

With the use of the two synchronized reels or drums, an adjustable tension which remains constant and may go up to the limit load, acts on the sawing part of the wire between the two reels. This becomes favorable in every respect as regards the sawing operation.

In lieu of reduction gear motors, of course, corresponding brakes may be provided which prevent such an unintentional unwinding.

In order that the wire does not unwind itself in the turned-off condition, either a brake motor may also be used which in the non-energized condition thereof prevents a rotation of the reel or drum, or otherwise an electromagnetic stopping means may be used which avoids the unwinding of the wire and opens only when energized.

Figure 8:
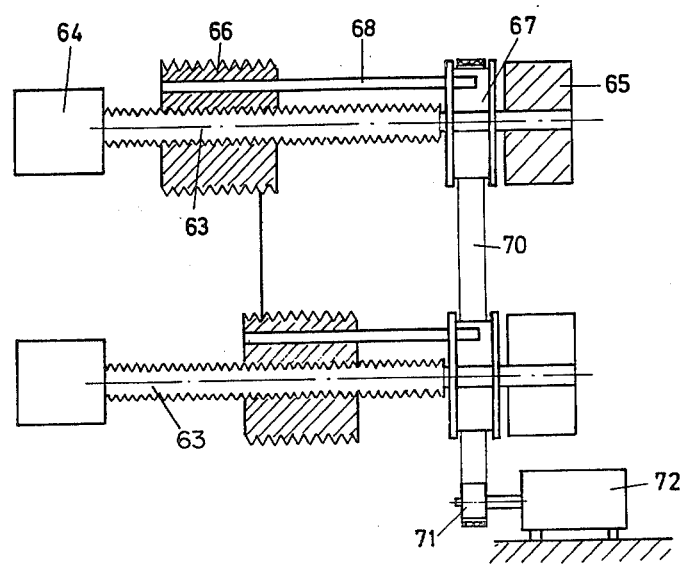
FIG. 8 is a schematic view, partially in cross section, of a further embodiment of saw installation according to the present invention with fixed shafts and reels or drums adapted to be moved to and fro thereon in accordance with the present invention.

FIG. 8 illustrates a further embodiment of a wire saw in accordance with the present invention.

An upper threaded shaft 63 is non-rotatably held in two bearings 64 and 65 whereas a reel or drum 66 which has exactly the same threads as the threaded shaft 63 both within the bore as also on the outside thereof, is axially displaceably and rotatably arranged on the shaft 63. The reel or drum 66 is driven by way of an entrainment member 68 from a toothed disk or pulley 67 by means of a toothed belt 70 itself driven by a driving motor 72 and a pinion 71. This toothed belt 70 drives at the same time an analogous arrangement having a threaded shaft, bearings, a reel or drum and a toothed disk. The direction of rotation of the two reels or drums must be different if they both have right-hand threads.

With the same direction of rotation, the one spindle 63 must have a right-hand thread and the other spindle 63 a left-hand thread. The selection of the reel or drum diameter $2a$ depends, inter alia, on the electromagnetic force in the motor which is available. The saw wire tension is produced by weights, spring forces, or electro-magnets.

If the two reels or drums are arranged in a common frame, then the latter can be moved to and fro a whole in order to leave the saw wire between the two reels in its saw plane with an immovable workpiece.

The drive for the to and fro movement can take place also electromagnetically (stepping motor), hydraulically or pneumatically.

It is also understood that the various embodiments, shown and described only for illustrative purposes, can also be combined with each other within the purview of the present invention.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A wire saw including a reel means for receiving a finite saw wire, said reel means being arranged on a shaft, being provided with thread-like grooves and being displaceable in its longitudinal axis, a rotary drive means operatively connected with said reel means, and an axially parallel wire holder structure disposed opposite the reel means, whereby the sawing plane is located between the reel means and the wire holder srtucture, characterized in that the wire holder structure includes at least one further reel means with thread-like grooves and displaceable in the direction of its longitudinal axis which, as regards its direction of rotation and rotational speed, is synchronized with the rotary drive means and further means operable to displace the reel means in opposite direction to the axial wire displacement and to maintain thereby the cutting plane of the wire with respect to the workpiece.

2. A wire saw according to claim 1, characterized in that the saw wire moved to and fro is provided with a diamond chip coating.

3. A wire saw according to claim 1, characterized in that two wire-receiving, driven reel means are provided which are synchronously driven.

4. A wire saw according to claim 3, characterized in that the reel means are driven in the same direction of rotation.

5. A wire saw according to claim 3, characterized in that the reel means are driven in opposite directions of rotation.

6. A wire saw according to claim 3, characterized in that the reel means are electrically driven by means of two electric motors.

7. A wire saw according to claim 1, characterized in that the two reel means are arranged displaceable in the longitudinal direction thereof on their respective shafts.

8. A wire saw according to claim 1, characterized in that a respective reel means includes a threaded bore and the shaft includes an analogous external thread, whereby the thread-like grooves of the reel means and the threads in said bore and on said shaft have the same pitch, and the reel means include a drive means operatively connected with the reel means and enabling axial displacement of each reel means on its respective shaft.

9. A wire saw according to claim 8, characterized in that the reel means are connected with the drive means by way of entrainment means.

10. A wire saw with a workpiece support surface according to claim 1, characterized in that the saw wire and the workpiece support surface subtend an acute angle.

11. A wire saw according to claim 1, characterized in that a further drive means is provided in order to reciprocate the shaft with the reel means and its drive means synchronously with the same.

12. A wire saw according to claim 11, characterized in that the further drive means includes a toothed rack transmission.

13. A wire saw according to claim 1. characterized in that both reel means are driven by a reduction gear motor each.

14. A wire saw according to claim 13, characterized in that each reel means and shaft are made in one piece.

15. A wire saw according to claim 1, characterized in that the reel means with their drive means are each arranged on a pivot arm, whereby one pivot axis is arranged parallel and the other pivot axis at right angle to the axes of rotation of the reel means.

16. A wire saw according to claim 15, characterized in that one lever is operable to be loaded by an adjustable force in order to tension the saw wire.

17. A wire saw according to claim 1, characterized by a common toothed belt drive means for the reel means arranged on the shafts.

18. A wire saw according to claim 1, characterized in that the two reel means are arranged on separate shafts in a common frame and drive means are provided in order to move the frame means to and fro corresponding to the pitch of the thread-like grooves.

19. A wire saw according to claim 7, characterized in that a respective reel means includes a threaded bore and the shaft includes an analogous external thread, whereby the thread-like grooves of the reel means and the threads in said bore and on said shaft have the same pitch, and the reel means include a drive means operatively connected with the reel means and enabling axial displacement of each reel means on its respective shaft.

20. A wire saw according to claim 19, characterized in that the reel means are connected with the drive means by way of entrainment means.

* * * * *